US010491643B2

(12) United States Patent
Brown et al.

(10) Patent No.: US 10,491,643 B2
(45) Date of Patent: Nov. 26, 2019

(54) INTELLIGENT AUGMENTED AUDIO CONFERENCE CALLING USING HEADPHONES

(71) Applicant: Apple Inc., Cupertino, CA (US)

(72) Inventors: Suzanne C. Brown, San Jose, CA (US); Gaetan R. Lorho, Redwood City, CA (US); Jonathan D. Sheaffer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 15/621,890

(22) Filed: Jun. 13, 2017

(65) Prior Publication Data

US 2018/0359294 A1    Dec. 13, 2018

(51) Int. Cl.
*H04L 29/06* (2006.01)
*H04M 3/42* (2006.01)
*H04M 3/56* (2006.01)
*H04S 7/00* (2006.01)
*H04R 3/00* (2006.01)

(52) U.S. Cl.
CPC ...... *H04L 65/403* (2013.01); *H04M 3/42059* (2013.01); *H04M 3/568* (2013.01); *H04S 7/304* (2013.01); *H04S 7/306* (2013.01); *H04R 3/005* (2013.01); *H04S 2400/01* (2013.01); *H04S 2400/11* (2013.01); *H04S 2420/01* (2013.01)

(58) Field of Classification Search
CPC ............................ H04L 65/403; G10L 17/005
See application file for complete search history.

(56) References Cited

U.S. PATENT DOCUMENTS

| 6,243,476 | B1 | 6/2001 | Gardner |
| 6,327,567 | B1 | 12/2001 | Willehadson et al. |
| 7,876,903 | B2 | 1/2011 | Sauk et al. |
| 8,249,233 | B2 | 8/2012 | Loupia et al. |
| 8,509,454 | B2 | 8/2013 | Kirkeby et al. |
| 9,337,790 | B2 | 5/2016 | Hetherington et al. |
| 9,445,174 | B2 | 9/2016 | Virolainen |

(Continued)

FOREIGN PATENT DOCUMENTS

EP    2618564 A1    7/2013

*Primary Examiner* — Zhensheng Zhang
(74) *Attorney, Agent, or Firm* — Womble Bond Dickinson (US) LLP (57) ABSTRACT

In one aspect herein, a pre-processor receives audio signals for a conference call from individual callers, each of the audio signals associated with corresponding metadata, analyzes the metadata, and associates each of the audio signals with a spatial position in a virtual representation of the conference call based on the analyzation of the metadata. A spatial arrangement processor generates a binaural room impulse response associated with the spatial position of each of the audio signals to filter the received audio signals to account for the spatial position associated with each of the audio signals and to account for the effect of the virtual representation of the conference call. A head-tracking controller tracks an orientation of a listener's head using a headset. A binaural renderer produces multi-channel audio data for playback on the headset according to the orientation of the listener's head and the binaural room impulse response associated with the spatial position of each of the audio signals.

23 Claims, 4 Drawing Sheets

(56) References Cited

U.S. PATENT DOCUMENTS

| | | | |
|---|---|---|---|
| 2004/0013252 A1* | 1/2004 | Craner | H04M 1/247 |
| | | | 379/142.01 |
| 2008/0260131 A1 | 10/2008 | Akesson | |
| 2010/0215164 A1 | 8/2010 | Sandgren et al. | |
| 2015/0024725 A1* | 1/2015 | Lang | H04M 1/72572 |
| | | | 455/417 |
| 2015/0223002 A1* | 8/2015 | Mehta | H04S 7/30 |
| | | | 381/303 |

* cited by examiner

INTELLIGENT AUGMENTED AUDIO CONFERENCE CALLING USING HEADPHONES

FIELD

Aspects of the disclosure herein relate to audio conference calling using a headset.

BACKGROUND

Multiparty audio conference calls typically include audio signals from individual callers in different locations, such that it may be difficult to recognize who is speaking by voice alone. Often, a listener uses a stereo headset to listen to the conversation, and the audio signals may be processed to enhance recognition of the different participants.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Several embodiments are now explained with reference to the appended drawings. Whenever aspects are not explicitly defined, the scope of the embodiments described herein are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

Multiparty conference calls often have callers participating from different locations which may be all over the world. In situations without video feedback, it is especially difficult to identify a speaker. Often, when callers can't be identified or heard, interaction during such conference calls may be awkward. Embodiments discussed herein aim to provide a more intuitive, clear teleconference experience.

Thus, an embodiment herein aims to spatially divide audio signals from individual callers in a multiparty audio conference call to improve identification and speech intelligibility for a listener using a spatial audio headset. Audio signals from the individual callers are processed by simulating a virtual audio environment (e.g., virtual room) whose acoustic properties resemble those of the real environment in which the listener is situated. Metadata included in the audio signals may be used to automatically cluster callers and reposition groups of participants in the virtual audio environment. Using a head-tracked sound reproduction system, the audio signals are dynamically filtered with binaural room impulse responses to account for and preserve the rendered location of the callers in the virtual audio environment. To increase speech intelligibility, the listener can rotate to the position of the active speaker, similar to a natural conversation.

Such a spatial rendering audio system facilitates a means for utilizing the 'Cocktail Party' mechanism in the listener's brain, which is a key psychoacoustic process enabling an improved sound source segregation. It is therefore advantageously possible to more easily identify individual talkers and to increase speech intelligibility, without the need for visual cues or the need for a caller to state a name before talking during the conference call. Furthermore, it is advantageously possible to provide a virtual audio environment that is more natural sounding as compared to conventional technologies.

Figure 1:
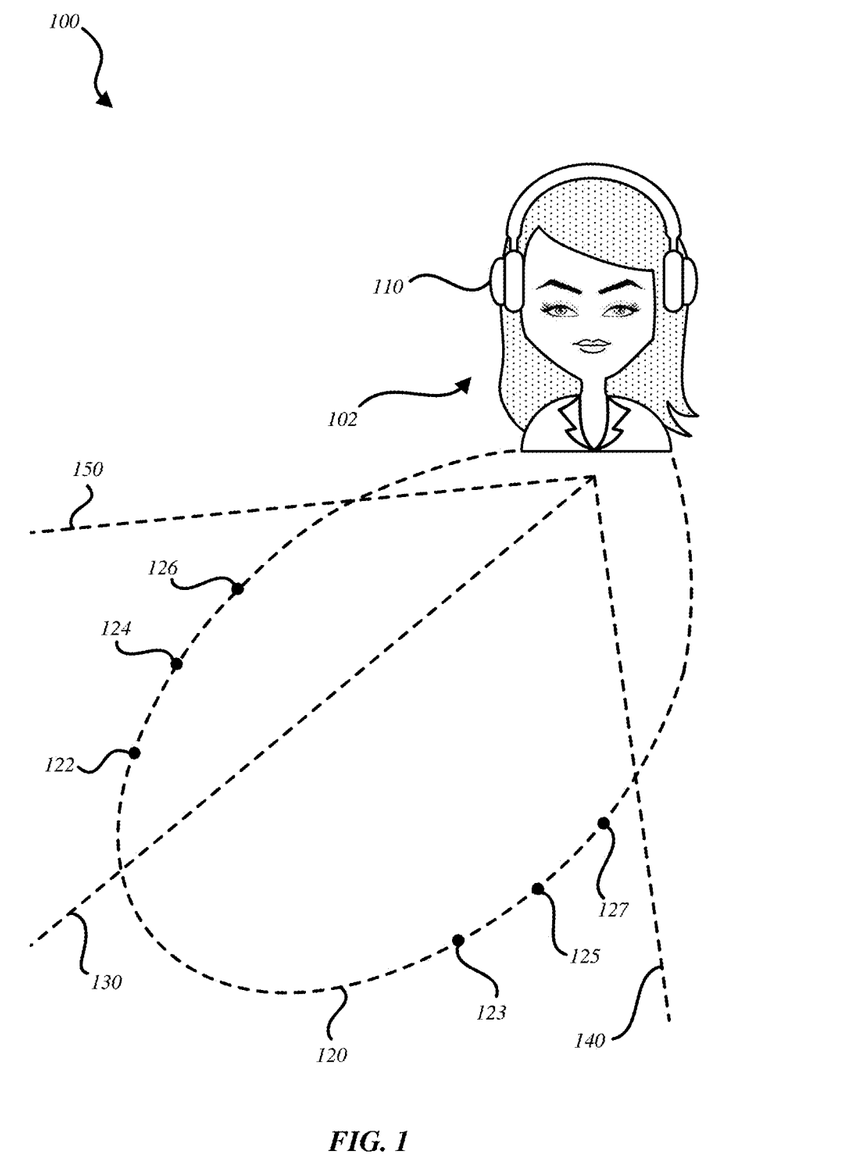
FIG. 1 illustrates an example for explaining an intelligent augmented audio conference call according to an embodiment.

Turning to FIG. 1, speech from callers participating in a conference call are played back by headset 110 being used by a listener 102 to participate in the conference call. In particular, in one embodiment, headset 110 may include two loudspeaker elements (e.g., loudspeaker elements 420 and 425 in FIG. 4), such as speaker drivers, for outputting binaural signals corresponding to speech and other audio data received from the callers participating in the conference call. The headset 110 may include one or more microphones (e.g., microphones 430 in FIG. 4) that may be integrated within the housing of the headset 110, and may have a fixed geometrical relationship to each other. These microphones may receive speech and other audio data from listener 120, for processing and transmission to the other callers participating in the conference call. In one embodiment, the underlying processing is used for cleaning up the telephony voice signals and may utilize techniques such as multi-microphone noise suppression and de-reverberation.

In one embodiment, audio signals from the individual callers are processed by simulating a virtual audio environment 100 (e.g., virtual room) whose acoustic properties resemble those of the real environment in which the listener 102 is situated. For example, virtual audio environment 100 may be generated in such a way that corresponds to listener 102's expectation of what the listening environment should sound like. By virtue of emulating the acoustic properties of the listening environment, in combination with head-tracked reproduction, externalization of sound sources is improved and therefore comprehensibility is also improved.

In one embodiment, virtual audio environment 100 may be automatically preset according to the listening environment in which listener 102 is situated. For example, if the listener 102 is in an outdoor environment, the audio system may generate a preset virtual audio environment generally suited for outdoor environments. Other preset environments may include reverberant environments (e.g., a conference hall, a church), closed rooms (e.g., an office). In one embodiment, the one or more microphones included in the headset 110 are used to measure and characterize the listening environment of listener 102 and the audio system uses this information to select the closest preset virtual audio environment. The preset virtual audio environments may be stored, for example, in memory 406, or any other memory accessible to the audio system.

By virtue of synthesizing virtual audio environment 100, it is possible to control the virtual direction and distance (e.g., spatial position) of a caller, such that each caller appears to listener 102 to be physically separated from another.

In one embodiment, metadata included in the audio signals may be used to automatically and intelligently cluster callers and position groups of participants in the virtual audio environment 100. For example, metadata may indicate one or more of the following: geographic location, time zone, affiliation (e.g., company, family), call signal quality, volume level or average volume level of speech, frequency of speech. In one embodiment, metadata may also include data input by a caller. In one embodiment, headset 110 may include a head-tracking sound reproduction system that is used to dynamically filter the audio signals with binaural room impulse responses to account for and preserve the rendered location of the callers in the virtual audio environment 100. To increase speech intelligibility, the listener 102 can rotate to the position of the active speaker, similar to a natural conversation. The binaural room impulse response (BRIR) is a representation of the impulse response from a source position to listener 102's left and right ears and takes into account the effects of reverberation of the listening environment. The BRIR allows the audio system to account for the influence of room acoustics on perception by listener 102. In one embodiment, the BRIR is associated with a spatial position (e.g., elevation, azimuth, distance) of an audio signal from a caller.

Returning to FIG. 1, various spatial arrangement options will now be discussed. In one embodiment, based on metadata included in the audio signals, callers are positioned along a straight line relative to listener 102 (e.g., 130, 140, 150). For example, callers may be assigned to various positions at different distances along the line, such that the virtual distance between listener 102 and each caller may be varied. In one embodiment, the position along the line may be assigned based on timing. Callers may be positioned along a line in the order of joining the conference call. As one example, in addition to axes 130, 140, 150, callers may be positioned along a horizontal axis facing listener 102 (e.g., spread out laterally), such that caller 1 is positioned in a left most position, caller 2 is added to the right of caller 1, and so on. In this way, listener 102 may keep track of the order in which the callers join the conference call according to the position of each caller along the line. In addition, the position along an axis may be assigned based on geographical location or time zone, such that the callers are spread out along a line based on time zone relative to listener 102.

In one embodiment, the position of the caller in the virtual audio environment 100 may be assigned based on groupings of the callers. Callers belonging to the same group may be clustered together and assigned spatial positions of a similar type, such that listener 102 may intuitively know to associate a particular type of spatial position (e.g., direction) with a description. The groupings may be based on metadata, such as affiliation (e.g., company, family), geographic location, call signal quality, etc., or any combination thereof. In a situation where metadata indicates that there are 2 distinct groups, callers from the first group may be assigned to spatial positions to the left of listener 102. These callers may be assigned at any position to the left of listener 102 (e.g., any position to the left side of axis 130) or along a particular axis to the left of listener 102 (e.g., along axis 140). In this situation, callers from the second group may be assigned to spatial positions to the right of listener 102 (e.g., any position to the right side of axis 130 or along axis 150). In this way, listener 102 may intuitively know that a speaker is likely from group 1 if the source of an audio signal appears to be from the left side of virtual audio environment 100 and that a speaker is likely from group 2 if the source of an audio signal appears to be from the right side of virtual audio environment 100. To increase speech intelligibility, the listener 102 can rotate to the position of the active speaker, similar to a natural conversation.

The audio system may specify multiple parameters for the type of spatial position. For example, callers from the first group may be assigned to spatial positions to the left of listener 102 (e.g., positions to the left of axis 130) and closer in distance to listener 102 (e.g., front-left), while callers from the second group may be assigned to spatial positions to the left of listener 102 and further away in distance from listener 102 (e.g., back-left). In this way, listener 102 may intuitively know that a speaker is likely from group 1 if the source of an audio signal appears to be from the front-left of virtual audio environment 100 and that a speaker is likely from group 2 if the source of an audio signal appears to be from the back-left. To increase speech intelligibility, the listener 102 can rotate to the position of the active speaker, similar to a natural conversation.

In one embodiment, the listener 102 is positioned in the center of virtual audio environment 100 and other callers are positioned in a 360° spacing around listener 102. For example, in response to listener 102 dialing into a conference call, the audio system may automatically assign listener 102 to a 0° position. In response to a first caller joining the conference call, the first caller is assigned the 360/2° position. In response to a second caller entering the conference call, the second caller is assigned the 360/3° position. This process may be repeated for the number of callers "n". In one embodiment, the callers are spaced around listener 102 at spatial positions corresponding to the ear level of listener 102. In one embodiment, callers may be assigned any coordinates among full spherical coordinates around listener 102, thus enabling further degrees of separation in the positions of the callers.

In one embodiment, the audio system augments a conference room table 120 and callers are positioned around the augmented reality table 120. For example, if grouping results in 2 groups of callers, callers from group 1 may be positioned around table 120 to the left of listener 102 (e.g., at positions 123, 125, 127) and callers from group 2 may be positioned around table 120 to the right of listener 102 (e.g., at positions 122, 124, 126). Although FIG. 1 illustrates conference room table 120 as an oval, any suitable shape may be provided, including round, rectangular, square, etc.

In one embodiment, the position of the caller in the virtual audio environment 100 may be automatically assigned based on a determination that the caller is a main speaker or a most frequent talker. This determination may be made, for example, based on metadata indicating that the caller is a most frequent talker among the callers participating in the conference call. A main speaker may be assigned to a dominant position in virtual audio environment 100, such as directly front and center of listener 102 (e.g., along axis 130 and at ear level). In embodiments involving clustering of callers into groups, the audio system may identify a main speaker for each group and assign each main speaker to a dominant position. In one embodiment, a caller identified as a main speaker may be positioned in a dominant position regardless of what else the metadata indicates (e.g., regardless of affiliation).

In one embodiment, the position of the caller may be automatically assigned based on call signal quality or type (e.g., bandwidth of the line). Depending on the network connection and the back-end of a particular participant, the telephony signals may vary in sound quality. In this context, for example, a low signal quality may suffer from a narrowed audio frequency range, audio drop-outs, increased electrical noise and/or other encoding artifacts, which directly affects the intelligibility of the signal. This can be compensated for by prioritizing these participant signals in spatially dominant positions. For example, a caller having a poor quality call signal may be assigned an acoustically optimal position in virtual audio environment 100 to improve clarity.

In one embodiment, in addition to assigning a spatial position to each audio signal, the volume level or the average volume level of the audio signal is also automatically adjusted. This may be particularly useful in situations where the audio signal includes background noise, in which case it may be desirable to reduce the volume level of that particular audio signal. In other situations, it may be useful to normalize the volume levels or the average volume levels of all of the audio signals, such that they appear equal to listener 102.

Figure 2:
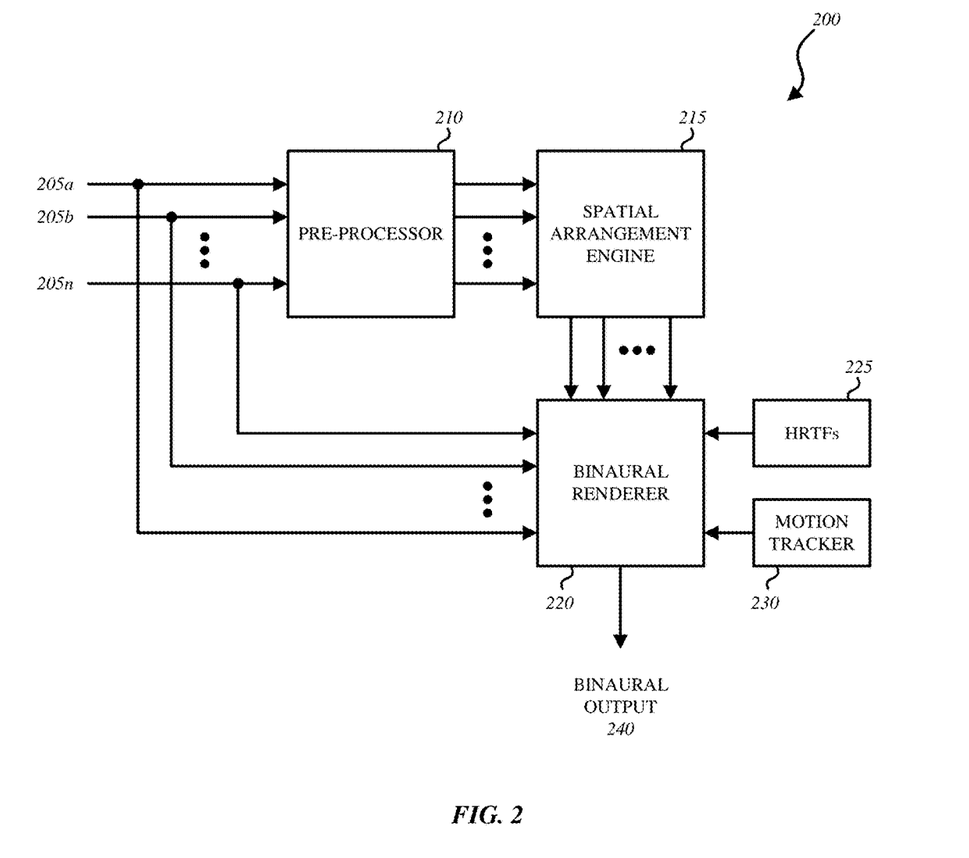
FIG. 2 illustrates a block diagram for explaining an audio system for intelligent augmented audio conference calling according to an example embodiment.

Turning to FIG. 2, FIG. 2 illustrates an example for explaining an audio system 200 for intelligent augmented audio conference calling. In the embodiment of FIG. 2, audio system 200 includes pre-processor 210, spatial arrangement engine 215, and binaural renderer 220. Pre-processor 210 is configured to receive incoming audio signals 205a, 205b, 205c from each caller participating in the conference call. The audio signals 205a, 205b, 205c include corresponding metadata, which may indicate, for example, one or more of the following: geographic location, time zone, affiliation (e.g., company, family), call signal quality, volume level of speech, frequency of speech. Also input to pre-processor 210 is information received from headset 110. In one embodiment, the one or more microphones included in the headset 110 are used to measure and characterize the listening environment of listener 102 and the audio system uses this information to select the closest preset virtual audio environment. The preset virtual audio environments may be stored, for example, in memory 406, or any other memory accessible to the audio system. In addition, head-tracking information may be provided to pre-processor 210 as metadata.

Pre-processor 210 collects the audio signals 205a, 205b, 205c and the corresponding metadata, as well as information from headset 110, and automatically analyses and organize the metadata. In one embodiment, pre-processor 210 employs a perceptual clustering algorithm to find important talker(s) using the metadata. It is therefore possible for the audio system 200 to focus on the identified talker or group of talkers when performing spatial rendering. As one example, the pre-processor 210 may identify from the metadata that there are 3 clusters of callers participating, pre-processor 210 may perform perceptual clustering to determine a most important cluster or a cluster that is easiest for listener 102 to perceive. Spatialization may then be based on the important cluster. As such, the metadata can be simplified and used to generate virtual audio environment 100 to increase comprehensibility for listener 102. Based on the analysis, pre-processor 210 automatically associates each of the audio signals with a spatial position in virtual audio environment 100. The spatial position may include azimuth, elevation and distance.

In one embodiment, pre-processor 210 uses machine learning to understand the talking habits of the participants, e.g. identification of a talker most likely to be dominant in the call. This, in turn, allows the pre-processor to automatically identify the individual callers and to automatically apply a preset spatial position to each individual caller, or automatically apply a spatial position preference for each individual caller. It is therefore possible for pre-processor 210 to improve accuracy and ease of use over time.

In one embodiment, a graphic user interface (GUI) may be provided to allow listener 102 to provide input to pre-processor 210 to modify the positioning or groupings (e.g., add or remove a caller from a group). In one embodiment, listener 102 may directly manipulate the positions of each caller in the virtual audio environment 100 in order to custom the spatial arrangement (e.g., using a touch and drag operation). Listener 102 may also manipulate his or her own spatial position. In one embodiment, pre-processor 210 automatically identifies groups of callers and assigns spatial positions to each caller, and then listener 102 may alter the results using the GUI.

Spatial arrangement engine 215 generates environmental cues by simulating the acoustics of the listening environment in which listener 102 is situated. In particular, spatial arrangement engine 215 generates real-time binaural room impulse responses (e.g., spatial filters) corresponding to metadata provided by the pre-processor 210, such as (but not limited to) the optimal position of the talker to be rendered in space. In one embodiment, spatial arrangement engine 215 generates the real-time binaural impulse responses using a dedicated acoustic simulation framework. Spatial arrangement engine 215 uses the binaural room impulse responses to dynamically filter the audio signals to account for and preserve the rendered positions (locations) of the callers in the virtual audio environment 100. The binaural room impulse response (BRIR) is a representation of the acoustical signature of a sound source in a room at the listener 102's left and right ears. The BRIR takes into account the effects of reverberation of the listening environment. The BRIR allows the audio system to account for the influence of room acoustics on perception by listener 102, and in particular encodes desired directions for each caller as well as how each caller acoustically interacts with the virtual audio environment 100. Thus, in one embodiment, spatial arrangement engine 215 determines the directional information required for binaural renderer 220 to be able to integrate with HRTFs 225.

Binaural renderer 220 is a head-tracked, dynamic convolution engine which renders binaural output 240 from the filters (BRIRs) provided by spatial arrangement engine 215 and the audio signals provided by pre-processor 210, according to the positioning choices made by pre-processor 210 and to the instantaneous orientation of the listener's head provided by motion tracker 230. HRTFs 225 provide a head-related transfer function representing the response of listener 102's ears, such that it is possible to synthesize binaural output 240. Binaural renderer 220 therefore takes into account the movement (head motion) of listener 102, that is, the angle of the head of a listener with respect to the spatial location of all talkers. In one embodiment, binaural renderer 220 also takes into account the individual features of listener 102's ears.

By virtue of the arrangement of audio system 200, and particularly pre-processor 210 and spatial arrangement engine 215, it is possible to provide a personalized conference calling experience.

While the audio system 200 is illustrated with various components of an audio system, it is not intended to represent any particular architecture or manner of interconnecting the components. In addition, the components are not limited to the specific orders used as examples in FIG. 2. Rather, any of the components may be re-ordered, combined or removed, performed in parallel or in serial, as necessary, to achieve the results set forth above. Furthermore, a component may be communicatively coupled to another component such that information or data input to or generated by the component may be shared as needed.

Figure 3:
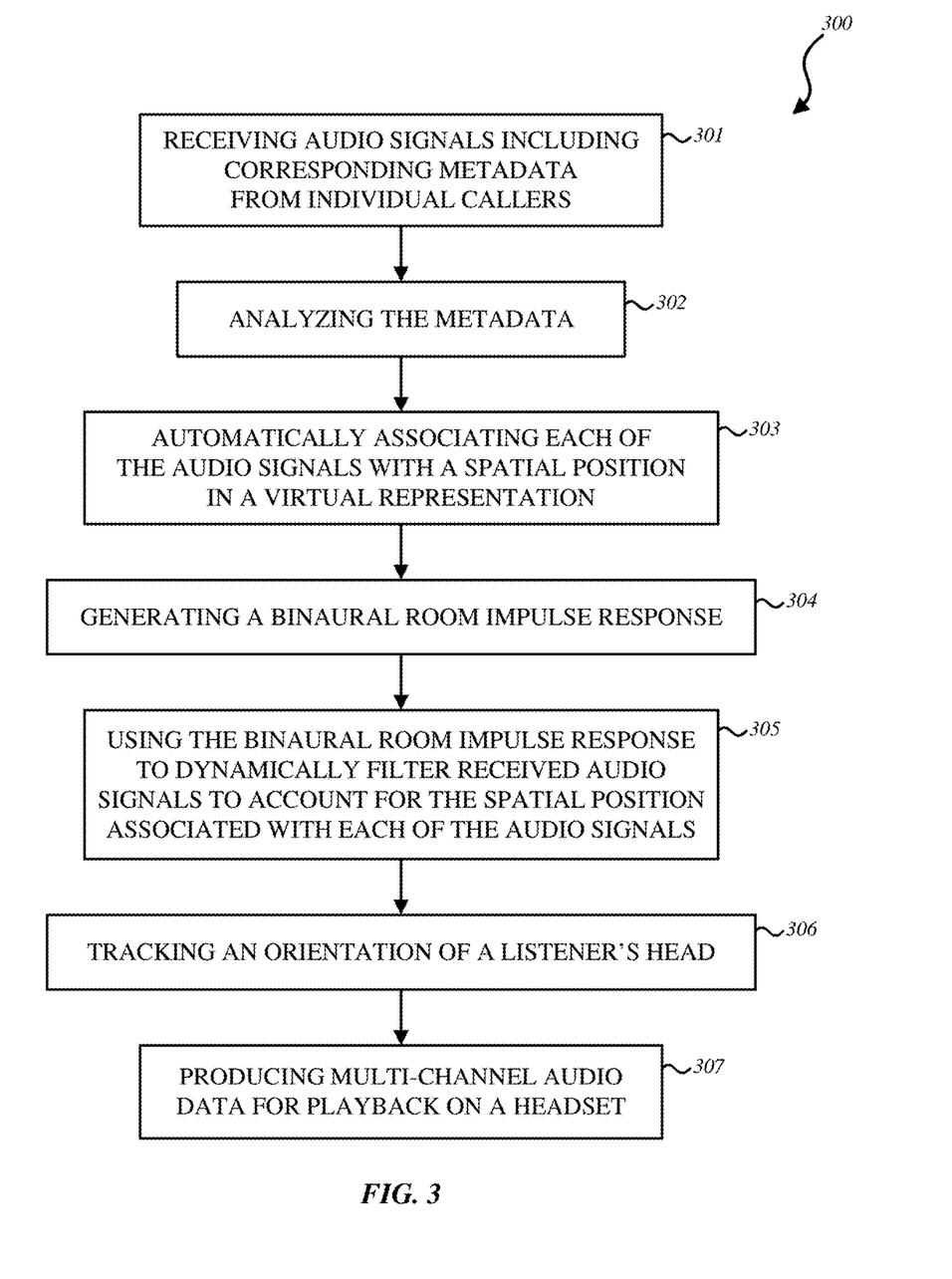
FIG. 3 illustrates a flow chart for explaining intelligent augmented audio conference calling according to an example embodiment.

FIG. 3 illustrates a flow diagram for explaining intelligent augmented audio conference calling according to an example embodiment. In this regard, the following embodiments may be described as a process 300, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 300 may be performed by processing logic that includes hardware (e.g. circuitry, dedicated logic, etc.), software (e.g., embodied on a non-transitory computer readable medium), or a combination thereof.

In the embodiment of FIG. 3, at block 301, pre-processor 210 receives audio signals 205a, 205b, 205c, from individual callers for a conference call, each of the audio signals 205a, 205b, 205c including corresponding metadata. At block 302, pre-processor 210 analyzes the metadata. At block 303, pre-processor 210 automatically associates each of the audio signals with a spatial position in a virtual representation of the conference call (e.g., virtual environment 100) based on the analyzation of the metadata.

At block 304, spatial arrangement engine 215 generates a binaural room impulse response, and at block 305 spatial arrangement engine 215 uses the binaural room impulse response to dynamically filter the received audio signals to account for the spatial position associated with each of the audio signals. At block 306, a head-tracking device included in headset 110 tracks an orientation of listener 102's head. At block 307, binaural renderer 220 produces binaural output 240 for playback on headset 110 according to the orientation of the listener 102's head and the spatial position associated with each of the audio signals.

Thus, it is possible to provide an audio system 200 that automatically selects tuning parameters (e.g., spatial positions, groups, volume, etc.) for improving comprehensibility according to a listener's environment. In this regard, it is possible to provide a holistic approach to audio conference calling.

In addition, it is possible to increase externalization of sound sources. In this regard, the inventors herein have recognized that conventional spatial manipulation processes often result in callers appearing to be located inside a listener's head. By virtue of the audio system 200 discussed herein, it is possible to externalize sound sources and augment reality such that callers are perceived by the listener to be in the same room.

Moreover, by virtue of incorporating head tracking into headset 110, it is possible to compensate for head movement. In this regard, the inventors herein have recognized that for conventional spatial manipulation processes, when a listener moves, the callers appear to be moving with the listener. By using head tracking, it is possible to alleviate this issue.

Furthermore, by virtue of audio system 200, it is possible to avoid manual design of the augmented acoustic environment, since audio system 200 performs spatial positioning automatically, based on metadata. Such manual design may be time consuming, since it may require the listener to assign a position to each caller as the caller joins.

Figure 4:
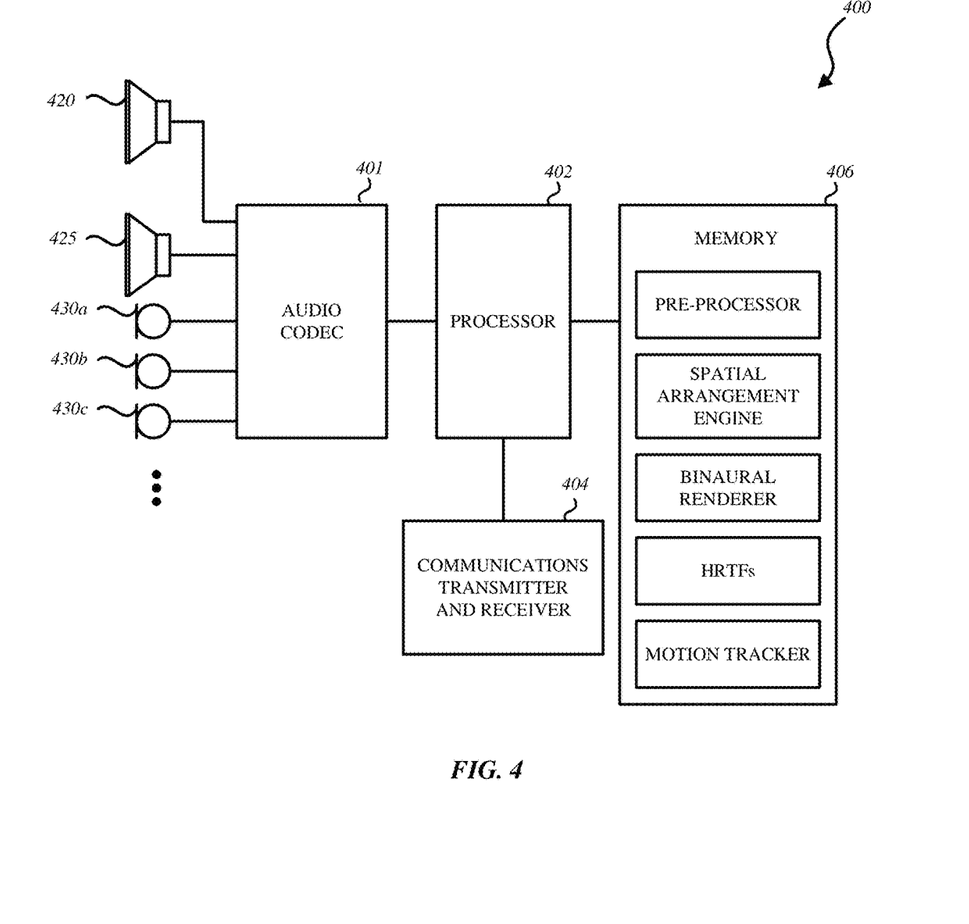
FIG. 4 illustrates an example implementation of an audio system for intelligent augmented audio conference calling according having a programed processor according to an example embodiment.

FIG. 4 is an example implementation of the audio systems described above in connection with FIG. 2, that has a programmed processor 402. The components shown may be integrated within a housing such as that of a headset 110 (e.g., see FIG. 1.) These include a number of microphones 430 (430a, 430b, 430c, . . . ) which may have a fixed geometrical relationship to each other and loudspeaker elements 420 and 425 which also may have a fixed geometrical relationship to each other. Microphones 430 may also have a fixed geometrical relationship to loudspeaker elements 420 and 425. The audio signals may be provided to the processor 402 and/or to a memory 406 (e.g., solid state non-volatile memory) for storage, in digital, discrete time format, by an audio codec 401. The processor 402 may also provide the audio signals to a communications transmitter and receiver 404, e.g., as an uplink communications signal of an ongoing conference call.

The memory 406 has stored therein instructions that when executed by the processor 402 receive audio signals for a conference call from individual callers, analyze metadata, automatically associate each of the audio signals with a spatial position in a virtual representation of the conference call based on the analyzation of the metadata, generate a binaural room impulse response, use the binaural room impulse response to dynamically filter the received audio signals to account for the spatial position associated with each of the audio signals, track, by a head-tracking controller, an orientation of a listener's head, wherein the listener is using the headset, and produce, by a binaural renderer, multi-channel audio data for playback on the headset according to the orientation of the listener's head and the spatial position associated with each of the audio signals (as described above in connection with FIGS. 1-3). To address possible detrimental artifacts arising from processing latency, one or more of these impulse responses may be pre-generated and pre-stored in memory. The instructions that program the processor 402 to perform all of the processes described above, or to implement processing by the pre-processor, the spatial arrangement engine, the binaural renderer, the HRTFs, the motion trackers, and any other processing, are all referenced in FIG. 4 as being stored in the memory 406 (labeled by their descriptive names, respectively.) These instructions may alternatively be those that program the processor 402 to perform the processes, or implement the components described above in connection with the embodiment of FIG. 2. Note that some of these circuit components, and their associated digital signal processes, may be alternatively implemented by hardwired logic circuits (e.g., dedicated digital filter blocks, hardwired state machines.)

FIG. 4 is merely one example of a particular implementation and is merely to illustrate the types of components that may be present in the audio system. While the audio system 400 is illustrated with various components of an audio system, it is not intended to represent any particular architecture or manner of interconnecting the components; as such details are not germane to the embodiments herein. It will also be appreciated that network computers, handheld computers, mobile phones, servers, audio systems for homes, audio systems for vehicles, and/or other data processing systems which have fewer components or perhaps more components may also be used with the embodiments herein. Accordingly, the processes described herein are not limited to use with the hardware and software of FIG. 4.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio system may be performed by one or more programmable processors executing one or more computer programs stored on a non-transitory computer readable storage medium to perform the functions of the system. All or part of the audio system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain embodiments have been described and shown in the accompanying drawings, it is to be understood that such embodiments are merely illustrative of and not restrictive, and the invention is not limited to the specific constructions and arrangements shown and described, since various other modifications may occur to those of ordinary skill in the art. The description is thus to be regarded as illustrative instead of limiting.

The invention claimed is:

1. An audio conference calling system including a headset, the audio conference calling system comprising:
   a pre-processor for receiving audio signals for a conference call from individual callers, each of the audio signals associated with corresponding metadata, for analyzing the metadata to determine an importance of the individual callers, and for associating each of the audio signals with a spatial position in a virtual representation of the conference call based on the importance of the individual callers, wherein one or more of the audio signals are automatically assigned to spatially dominant positions in the virtual representation based on the importance of the individual callers;
   a spatial arrangement processor for generating a binaural room impulse response associated with the spatial position of each of the audio signals and for using the binaural room impulse response to filter the received audio signals to account for the spatial position associated with each of the audio signals and to account for the effect of the virtual representation of the conference call;
   a head-tracking controller for tracking an orientation of a listener's head, wherein the listener is using the headset; and
   a binaural renderer for producing multi-channel audio data for playback on the headset according to the orientation of the listener's head and the binaural room impulse response associated with the spatial position of each of the audio signals.

2. The audio conference calling system of claim 1 wherein the pre-processor associates each of the audio signals with a group based on the corresponding metadata, wherein the group of audio signals is associated with a similar type of spatial position in the virtual representation of the conference call.

3. The audio conference calling system of claim 2 wherein the metadata includes a group affiliation and the grouping is based on the group affiliation.

4. The audio conference calling system of claim 1 wherein the metadata includes one or more of the following: geographic location, time zone, affiliation, signal quality, average volume, frequency of speech.

5. The audio conference calling system of claim 1 wherein the spatial position includes azimuth, elevation and distance.

6. The audio conference calling system of claim 1 wherein the pre-processor associates each of the audio signals with the spatial position using machine learning based on a previous conference call or psycho acoustic knowledge, to determine what individual callers are calling, to determine a preset spatial position to apply to each individual caller, or to determine a spatial position preference for each individual caller.

7. The audio conference calling system of claim 1 wherein analyzing the metadata includes employing a dimensionality reduction algorithm to the metadata to filter metadata to be used to associate each of the audio signals with the spatial position in the virtual representation of the conference call.

8. The audio conference calling system of claim 1 wherein the spatial arrangement processor generates the binaural room impulse response using a dedicated simulation framework.

9. The audio conference calling system of claim 1 wherein the spatial arrangement processor generates environmental cues and simulates a room of the listener to determine a direction of data to be encoded for each individual caller, for integration of the binaural renderer and the head-tracking controller.

10. The audio conference calling system of claim 1 wherein in a case that the spatial arrangement processor identifies at least two clusters of individual callers, the spatial arrangement processor identifies one of the at least two identified clusters of individual callers as an important cluster based on the importance of one or more of the individual callers in the important cluster, and wherein the spatial positioning of the audio signals from the one or more individual callers in the important cluster is based on the importance of the one or more individual callers in the important cluster.

11. The audio conference calling system of claim 1 wherein in a case where one of the individual callers is identified as leading the conversation, the audio signal from the identified individual caller is spatially positioned in front of the listener in the virtual representation.

12. A method for an audio conference calling system including a headset, the method comprising:
  receiving, by a pre-processor, audio signals for a conference call from individual callers, each of the audio signals associated with corresponding metadata, analyzing the metadata to determine an importance of the individual callers, and associating each of the audio signals with a spatial position in a virtual representation of the conference call based on the importance of the individual callers, wherein one or more of the audio signals are automatically assigned to spatially dominant positions in the virtual representation based on the importance of the individual callers;
  generating, by a spatial arrangement processor, a binaural room impulse response associated with the spatial position of each of the audio signals and using the binaural room impulse response to filter the received audio signals to account for the spatial position associated with each of the audio signals and to account for the effect of the virtual representation of the conference call;
  tracking, by a head-tracking controller, an orientation of a listener's head, wherein the listener is using the headset; and
  producing, by a binaural renderer, multi-channel audio data for playback on the headset according to the orientation of the listener's head and the binaural room impulse response associated with the spatial position of each of the audio signals.

13. The method of claim 12 wherein the pre-processor associates each of the audio signals with a group based on the corresponding metadata, wherein the group of audio signals is associated with a similar type of spatial position in the virtual representation of the conference call.

14. The method of claim 13 wherein the metadata includes a group affiliation and the grouping is based on the group affiliation.

15. The method of claim 12 wherein the metadata includes one or more of the following: geographic location, time zone, signal quality, average volume, frequency of speech.

16. The method of claim 12 wherein the spatial position includes azimuth, elevation and distance.

17. The method of claim 12 wherein the pre-processor associates each of the audio signals with the spatial position using machine learning based on a previous conference call or psycho acoustic knowledge, to determine what individual callers are calling, to determine a preset spatial position to apply to each individual caller, or to determine a spatial position preference for each individual caller.

18. The method of claim 12 wherein analyzing the metadata includes employing a dimensionality reduction algorithm to the metadata to filter metadata to be used to associate each of the audio signals with the spatial position in the virtual representation of the conference call.

19. The method of claim 12 wherein the spatial arrangement processor generates the binaural room impulse response using a dedicated simulation framework.

20. The method of claim 12 wherein the spatial arrangement processor generates environmental cues and simulates a room of the listener to determine a direction of data to be encoded for each individual caller, for integration of the binaural renderer and the head-tracking controller.

21. The method of claim 12 wherein in a case that the spatial arrangement processor identifies at least two clusters of individual callers, the spatial arrangement processor identifies one of the at least two identified clusters of individual callers as an important cluster based on the importance of one or more of the individual callers in the important cluster, and wherein the spatial positioning of the audio signals from the one or more individual callers in the important cluster is based on the importance of the one or more individual callers in the important cluster.

22. The method of claim 12 wherein in a case where one of the individual callers is identified as leading the conversation, the audio signal from the identified individual caller is spatially positioned in front of the listener in the virtual representation.

23. A non-transitory computer-readable storage medium storing executable program instructions which when executed by a data processing system cause the data processing system to perform a method for controlling an audio conference calling system including a headset, the method comprising:
  receiving, by a pre-processor, audio signals for a conference call from individual callers, each of the audio signals associated with corresponding metadata, analyzing the metadata to determine an importance of the individual callers, and associating each of the audio signals with a spatial position in a virtual representation of the conference call based on the importance of the individual callers, wherein one or more of the audio signals are automatically assigned to spatially dominant positions in the virtual representation based on the importance of the individual callers;
  generating, by a spatial arrangement processor, a binaural room impulse response associated with the spatial position of each of the audio signals and using the binaural room impulse response to filter the received audio signals to account for the spatial position associated with each of the audio signals and to account for the effect of the virtual representation of the conference call;
  tracking, by a head-tracking controller, an orientation of a listener's head, wherein the listener is using the headset; and
  producing, by a binaural renderer, multi-channel audio data for playback on the headset according to the orientation of the listener's head and the binaural room impulse response associated with the spatial position of each of the audio signals.

* * * * *